United States Patent
Selvaraj

(10) Patent No.: US 7,496,549 B2
(45) Date of Patent: Feb. 24, 2009

(54) MATCHING PURSUIT APPROACH TO SPARSE GAUSSIAN PROCESS REGRESSION

(75) Inventor: Sathiya Keerthi Selvaraj, South Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 186 days.

(21) Appl. No.: 11/282,306

(22) Filed: Nov. 18, 2005

(65) Prior Publication Data

US 2006/0271532 A1 Nov. 30, 2006

Related U.S. Application Data

(60) Provisional application No. 60/685,660, filed on May 26, 2005.

(51) Int. Cl.
G06N 5/00 (2006.01)

(52) U.S. Cl. .......................................... 706/25; 706/45

(58) Field of Classification Search .................. 706/25; 382/118; 702/182; 707/1
See application file for complete search history.

(56) References Cited

U.S. PATENT DOCUMENTS

| | | | |
|---|---|---|---|
| 6,189,002 B1 * | 2/2001 | Roitblat | 707/1 |
| 6,865,509 B1 * | 3/2005 | Hsiung et al. | 702/182 |
| 7,164,781 B2 * | 1/2007 | Kim et al. | 382/118 |
| 7,254,257 B2 * | 8/2007 | Kim et al. | 382/118 |

\* cited by examiner

*Primary Examiner*—Wilbert L Starks, Jr.
(74) *Attorney, Agent, or Firm*—Seth H. Ostrow; Ostrow Kaufman Frank LLP

(57) ABSTRACT

A system and method is provided for supervised learning. A training set is provided to the system. The system selects a training element from the provided training set, and adds the training element to a basis element set I. The system conducts an optimization test on the basis element set I with the selected training element to produce a selection score. The system determines whether the selection score indicates an improvement in optimization for the basis element set I. The system discards the selected element if the selection score does not indicate an improvement, and keeps the selected element if the selection score does indicate improvement. The process may then be repeated for other training elements until either the specified maximum number of basis functions is reached or improvement in optimization is below a threshold. At that point, the chosen set I should represent an optimized basis set.

34 Claims, 6 Drawing Sheets

MATCHING PURSUIT APPROACH TO SPARSE GAUSSIAN PROCESS REGRESSION

RELATED APPLICATIONS

This application claims priority to U.S. Ser. No. 60/685,660, filed on May 26, 2005 entitled "A MATCHING PURSUIT APPROACH TO SPARSE GAUSSIAN PROCESS REGRESSION."

FIELD OF THE INVENTION

The invention is a matching pursuit method for sparse gaussian process (GP) regression. Specifically, the invention provides a new basis selection system and method for building sparse GP regression models that provides gains in accuracy as well as efficiency over previous methods.

BACKGROUND OF THE INVENTION

Many problems in information processing involve the selection or ranking of items in a large data set. For example, a search engine that locates documents meeting a search query must often select items from a large result set of documents to display to the user, and often must rank those documents based on their relevance or other criteria. Similar exercises of selecting a set of items from a larger set of possible items are undertaken in other fields such as weather pattern prediction, analyzing commercial markets, and the like. Some complex mathematical models and processes have been developed to perform this analysis.

One such set of processes, Bayesian Gaussian processes, provide a probabilistic kernel approach to supervised learning tasks. The advantage of Gaussian process (GP) models over non-Bayesian kernel methods, such as support vector machines, comes from the explicit probabilistic formulation that yields predictive distributions for test instances and allows standard Bayesian techniques for model selection. The cost of training GP models is $O(n^3)$, where n is the number of training instances, which results in a huge computational cost for large data sets. Furthermore, when predicting a test case, a GP model requires $O(n)$ cost for computing the mean and $O(n^2)$ cost for computing the variance. These heavy scaling properties obstruct the use of GPs in large scale problems.

Sparse GP models bring down the complexity of training as well as testing. The Nystrom method has been applied to calculate a reduced rank approximation of the original n×n kernel matrix. One on-line algorithm maintains a sparse representation of the GP models. Another algorithm uses a forward selection scheme to approximate the log posterior probability. Another fast and greedy selection method builds sparse GP regression models. All of these attempt to select an informative subset of the training instances for the predictive model. This subset is usually referred to as the set of basis vectors, denoted as I. The maximal size of I is usually limited by a value $d_{max}$. As $d_{max} \ll n$, the sparseness greatly alleviates the computational burden in both training and prediction of the GP models. The performance of the resulting sparse GP models depends on the criterion used in the basis vector selection.

It would be desirable to provide a system and method for greedy forward selection for sparse GP models. Accordingly, there's a need for a system and method that yield better generalization performance, while essentially not effecting algorithm complexity. The preferred embodiments of the system and method described herein clearly address this and other needs.

BRIEF SUMMARY OF THE INVENTION

In a preferred embodiment, a system and method is provided for supervised learning. A training set is provided to the system. The system selects a training element from the provided training set, and adds the training element to a set of basis elements I (basis element set). The system conducts an optimization test on the basis element set I with the selected training element to produce a selection score. The system determines whether the selection score indicates an improvement in optimization for the basis element set I. The system discards the selected element if the selection score does not indicate an improvement, and keeps the selected element if the selection score does indicate improvement. The process may then be repeated for other training elements until either the specified maximum number of basis functions is reached or improvement in optimization is below a threshold. At that point, the chosen set I should represent an optimized basis set.

In one preferred embodiment, the selected element is selected at random. In another preferred embodiment, the system adds, in succession, a plurality of selected elements. In this embodiment, the scoring is performed on the basis element set I every $t^{th}$ addition of a selected element to the set of basis element set I, with t comprising a positive integer. This selection score is then used to decide whether to keep or discard the added selected elements.

In another preferred embodiment, the process of scoring the basis element comprises a sparse Gaussian process.

In another preferred embodiment, the process of determining the selection score comprises using post-backfitting.

In another preferred embodiment, the training set is for categorizing indexed web pages for a search engine.

DETAILED DESCRIPTION OF THE PREFERRED EMBODIMENTS

A preferred embodiment of a matching pursuit approach to sparse gaussian process regression system, constructed in accordance with the claimed invention, is directed towards a criterion of greedy forward selection for sparse GP models. The criterion used is more efficient than previous methods, while not affecting algorithm complexity. While the method is described as pertaining to regression, the method is also applicable to other supervised learning tasks.

Figure 1:
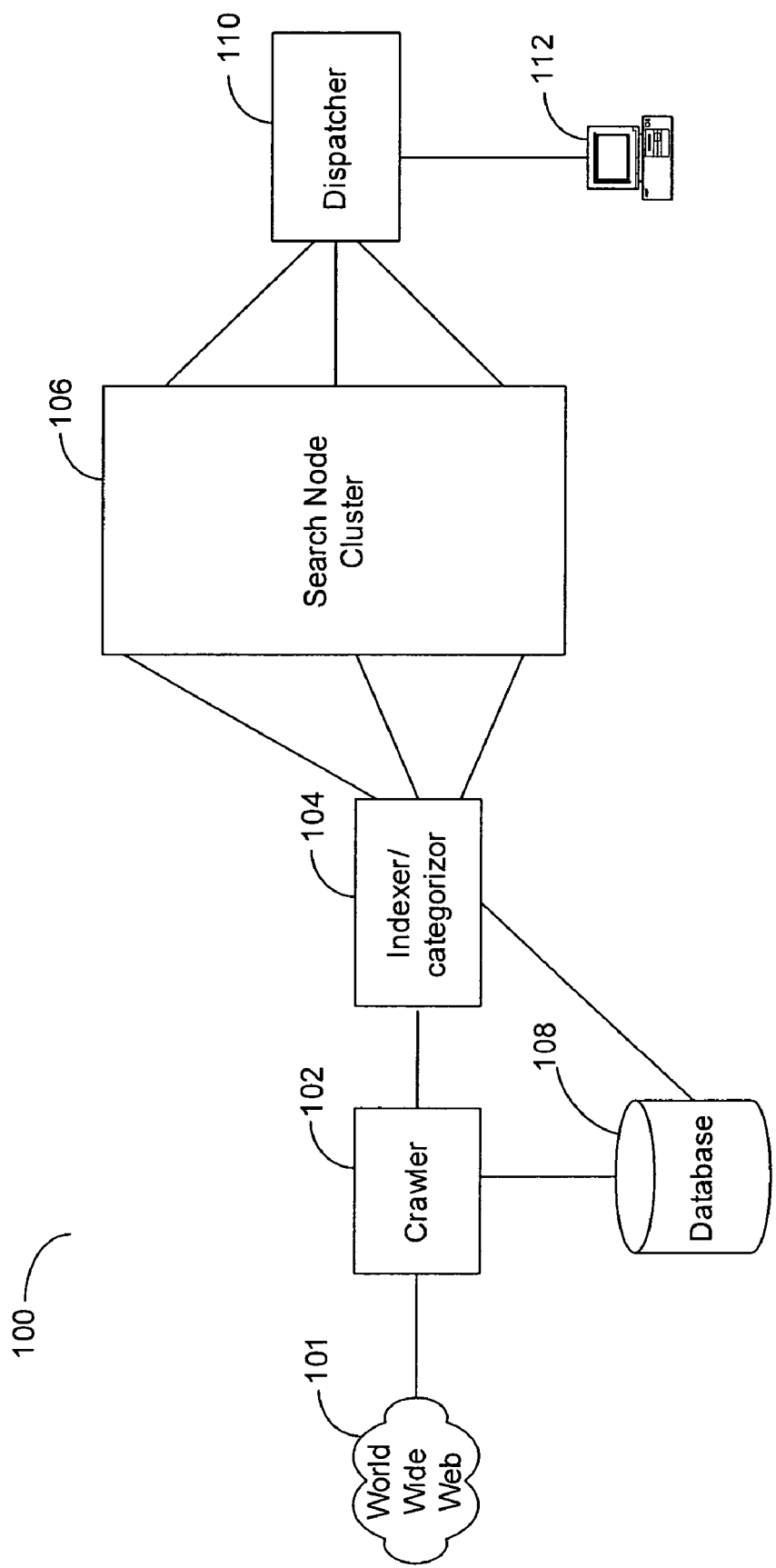
FIG. 1 is a block diagram illustrating components of a search engine in which one embodiment operates.

In one embodiment, as an example, and not by way of limitation, an improvement in Internet search engine categorization and scoring of web pages is provided. The World Wide Web is a distributed database comprising billions of data records accessible through the Internet. Search engines are commonly used to search the information available on computer networks, such as the World Wide Web, to enable users to locate data records of interest. A search engine system 100 is shown in FIG. 1. Web pages, hypertext documents, and other data records from a source 101, accessible via the Internet or other network, are collected by a crawler 102. The crawler 102 collects data records from the source 101. For example, in one embodiment, the crawler 102 follows hyperlinks in a collected hypertext document to collect other data records. The data records retrieved by crawler 102 are stored in a database 108. Thereafter, these data records are indexed by an indexer 104. Indexer 104 builds a searchable index of the documents in database 108. Common prior art methods for indexing may include inverted files, vector spaces, suffix structures, and hybrids thereof. For example, each web page may be broken down into words and respective locations of each word on the page. The pages are then indexed by the words and their respective locations. A primary index of the whole database 108 is then broken down into a plurality of sub-indices and each sub-index is sent to a search node in a search node cluster 106.

To use search engine 100, a user 112 typically enters one or more search terms or keywords, which are sent to a dispatcher 110. Dispatcher 110 compiles a list of search nodes in cluster 106 to execute the query and forwards the query to those selected search nodes. The search nodes in search node cluster 106 search respective parts of the primary index produced by indexer 104 and return sorted search results along with a document identifier and a score to dispatcher 110. Dispatcher 110 merges the received results to produce a final result set displayed to user 112 sorted by relevance scores. The relevance score is a function of the query itself and the type of document produced. Factors that affect the relevance score may include: a static relevance score for the document such as link cardinality and page quality, placement of the search terms in the document, such as titles, metadata, and document web address, document rank, such as a number of external data records referring to the document and the "level" of the data records, and document statistics such as query term frequency in the document, global term frequency, and term distances within the document. For example, Term Frequency Inverse Document Frequency (TFIDF) is a statistical technique that is suitable for evaluating how important a word is to a document. The importance increases proportionally to the number of times a word appears in the document but is offset by how common the word is in all of the documents in the collection.

Figure 2:
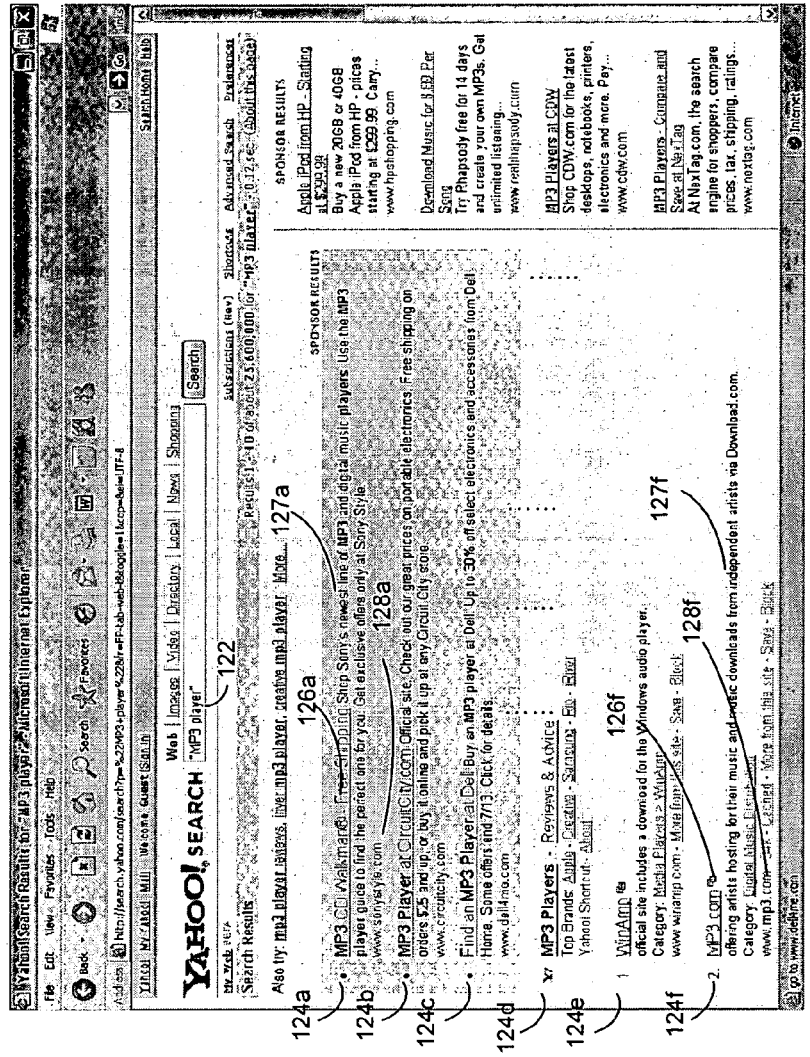
FIG. 2 is an example of a result set for the search engine of FIG. 1.

Referring to FIG. 2, there is shown an example of a result set 120. As shown therein, in response to a query 122 for the search term "MP3 player" shown on the top of the figure, the search engine YAHOO! searched its web index and produced a plurality of results in the form of result set 120 displayed to a user. For brevity, only a first page of result set 120 is shown. Result set 120 includes ten results 124*a-f*, each with a respective clickable hyperlink 126*a-j*, description 127*a-j*, and Internet addresses or uniform resource locator (URL) 128*a-j* for data records that satisfy query 122.

Usually the number of web pages in the result set is very large, sometimes even as large as a million. It is important to ensure that the documents displayed to the user are ordered according to relevance, with the most relevant displayed at the top. In one embodiment, for a given query-webpage pair, the Gaussian process (GP) nonlinear regression method described herein is used as a relevance scoring function.

Figure 3:
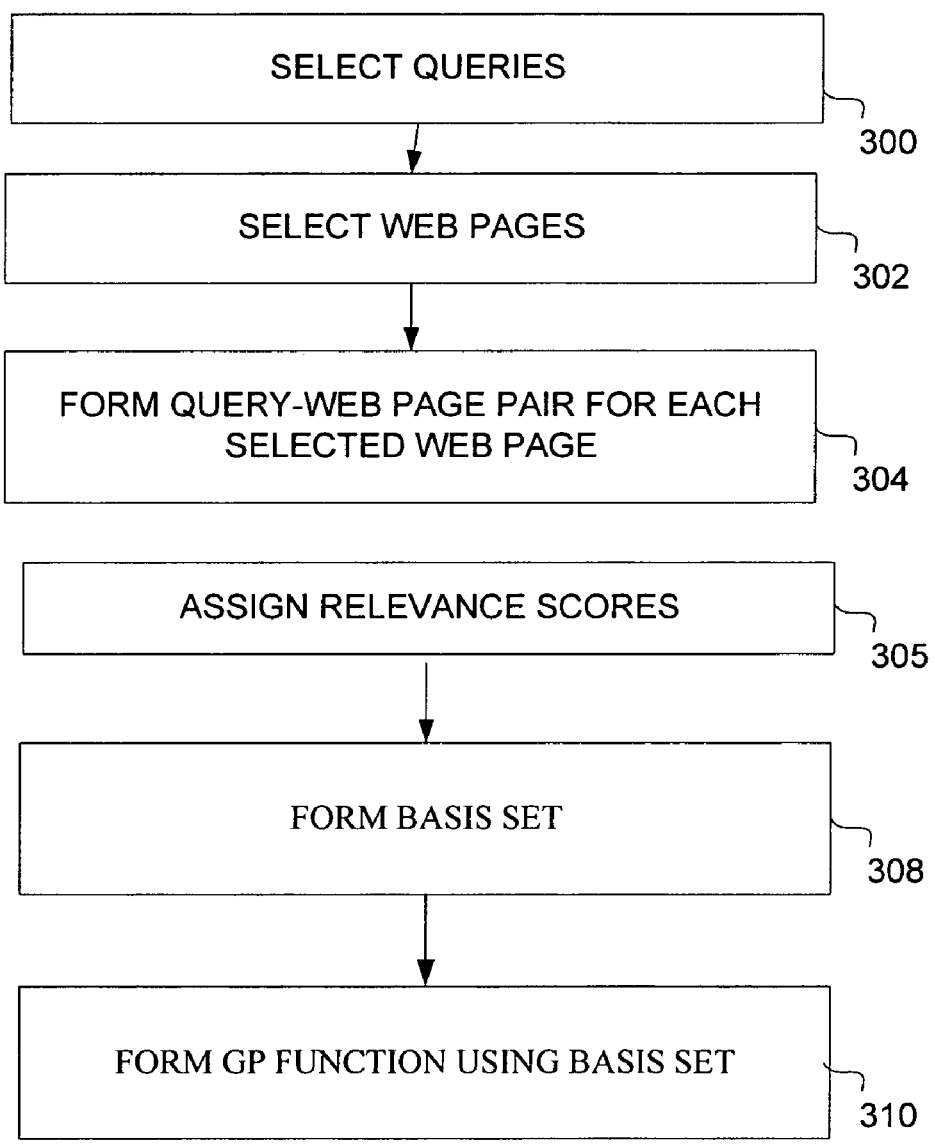
FIG. 3 is a flow diagram illustrating steps performed by the system according to one embodiment associated with search engine relevance ranking.

With reference to FIG. 3, a flow diagram illustrates the steps performed according to one embodiment. In step 300, a small set of random queries (e.g., a few 1000) are selected. In step 302, each query is processed, and a few hundred web pages are selected from the results for each query. Each web page forms a query-webpage pair associated with the query by which the web page was selected, step 304. An editorial team, or some other system, provides relevance scores, for example, values from 0-100, step 305. These are the scores that form the output training values (y) that the GP emulates. The number of example pairs are several hundreds of thousands, and a normal GP cannot handle this number with any efficiency. The sparse GP method described herein is then used to select a basis set, step 308 which is a special subset of the query-webpage pairs. In step 310, the final GP method is formed using the selected basis set.

According to one embodiment, the input vector (x) associated with a query-webpage pair is set to be selected features that help in prediction. By way of example, and not by way of limitation, those features include: query term occurrence frequency in the web page, web page length, eigenrank of the web page, spam index of the web page, first occurrence location of the query terms, family friendly rating of the web page, proximity of occurrences of the query terms in the web page, and the like. The relevance score is the output variable, y that is to be predicted.

In one embodiment, the method is implemented in the indexer/categoriser 104 as a supervised learning task. One of the advantages of the system 100 is that it results in faster categorization by using smaller and more accurate basis sets. In one embodiment, the method is implemented in software on a server or personal computer. However, those skilled in the art would recognize that the method can be implemented on any combination of hardware or software platforms that can be programmed to implement the methods described herein. Further, the method is not limited to use in search engine technology, but is generally useful in any kind of training or regression problem.

In regression problems, a training data set is provided composed of n samples. Each sample is a pair having an input vector $x_i \in \mathbb{R}^m$ and its corresponding target $y_i \in \mathbb{R}$. $\mathbb{R}$ is the set of reals and $\mathbb{R}^m$ is the m dimensional real vector space. The true function value at $x_i$ is represented as an unobservable latent variable $f(x_i)$ and the target $y_i$ is a noisy measurement of $f(x_i)$. The goal is to construct a predictive model that estimates the relationship $x \mapsto f(x)$.

In standard GPs for regression, the latent variables $\{f(x_i)\}$ are random variables in a zero mean Gaussian process indexed by $\{x_i\}$. The prior distribution of $\{f(x_i)\}$ is a multivariate joint Gaussian, denoted as $$P(f)=N(f;0,K)$$

where $f=[f(x_1), \ldots, f(x_n)]^T$ and K is the n×n covariance matrix whose ij-th element is $K(x_i, x_j)$, K being the kernel function. P denotes the probability function. The likelihood is essentially a model of the measurement noise, which is conventionally evaluated as a product of independent Gaussian noises, $$P(y|f)=N(y;f,\sigma^2 I)$$

where $y=[y_1, \ldots, y_n]^T$ and $\sigma^2$ is the noise variance. $N(f; \mu, \sigma^2)$ denotes the normal density function with mean $\mu$ and the variance $\sigma^2$. The posterior distribution $P(f|y) \propto P(y|f)P(f)$ is also exactly a Gaussian:

$$P(f|y)=N(f; K\alpha^*, \sigma^2 K(K+\sigma^2 I)^{-1}) \qquad (1)$$

where $\alpha^*=(K+\sigma^2 I)^{-1}y$. For any test instance x, the predictive model is represented by the predictive distribution $$P(f(x)|y)=\int P(f(x)|f)P(f|y)df=N(f(x); \mu_x, \sigma_x^2)$$

where $$\mu_x = k^T(K+\sigma^2 I)^{-1}y = k^T\alpha^* \quad (2)$$

$$\sigma_x^2 = K(x,x) - k^T(K+\sigma^2 I)^{-1}k \quad (3)$$

and $k=[K(x_1, x), \ldots, K(x_n, x)]^T$. The computational cost of training is $O(n^3)$, which mainly comes from the need to invert the matrix $(K+\sigma^2 I)$ and obtain the vector $\alpha^*$. For predicting a test instance the cost is $O(n)$ to compute the mean (2) and $O(n^2)$ for computing the variance (3). This heavy scaling with respect to n makes the use of standard GP computationally prohibitive on large datasets.

As opposed to other methods for working with a reduced number of latent variables, instead of assuming n latent variables for all the training instances, sparse GP models assume only d latent variables placed at some chosen basis vectors $\{\tilde{x}_i\}$, denoted as a column vector $f_I=[f(\tilde{x}_1), \ldots, f(\tilde{x}_d)]^T$. The prior distribution of the sparse GP is a joint Gaussian over $f_I$ only, i.e., $$P(f_I) = N(f_I; 0, K_I) \quad (4)$$

where $K_I$ is the d×d covariance matrix of the basis vectors whose ij-th element is $K(\tilde{x}_i, \tilde{x}_j)$.

These latent variables are then projected to all the training instances. The conditional mean at the training instances is $K_I^T, K_I^{-1} f_I$, where $K_{I,\cdot}$ is a d×n matrix of the covariance functions between the basis vectors and all the training instances. The likelihood can be evaluated by these projected latent variables as follows $$P(y|f_I) = N(y; K_{I,\cdot}^T K_I^{-1} f_I, \sigma^2 I) \quad (5)$$

The posterior distribution can then be written as $$P(f_I|y) = N(f_I; K_I\alpha_I^*, \sigma^2 K_I(\sigma^2 K_I + K_{I,\cdot} K_{I,\cdot}^T)^{-1} K_I) \quad (6)$$

where $\alpha_I^* = (\sigma^2 K_I + K_{I,\cdot} K_{I,\cdot}^T)^{-1} K_{I,\cdot} y$.

The predictive distribution at any test instance x is given by $$P(f(x)|y) = \int P(f(x)|f_I)P(f_I|y)df_I = N(f(x); \tilde{\mu}_x, \tilde{\sigma}_x^2)$$

where $$\tilde{\mu}_x = \tilde{k}^T \alpha_I^* \quad (7)$$

$$\tilde{\sigma}_x^2 = K(x,x) - \tilde{k}^T K_I^{-1}\tilde{k} + \sigma^2 \tilde{k}^T(\sigma^2 K_I + K_{I,\cdot} K_{I,\cdot}^T)^{-1}\tilde{k} \quad (8)$$

and $\tilde{k}$ is a column vector of the covariance functions between the basis vectors and the test instance x, i.e. $\tilde{k}=[K(\tilde{x}_1, x), \ldots, K(\tilde{x}_d, x)]^T$.

In large scale regression methods, the maximal size of the basis vectors is limited by a relatively small value $d_{max}$ that is much less than the number of the training instances n. A value for $d_{max}$ can be decided based on the CPU time that is available during training and/or testing.

While the cost of training the full GP model is $O(n^3)$, the training complexity of sparse GP models is only $O(nd_{max}^2)$. This corresponds to the cost of forming $K_I^{-1}$, $(\sigma^2 K_I + K_{I,\cdot} K_{I,\cdot}^T)^{-1}$ and $\alpha_I^*$. Thus, if $d_{max}$ is not big, learning on large datasets can be accomplished via sparse GP models. Also, for these sparse models, prediction for each test instance costs $O(d_{max})$ for the mean (7) and $O(d_{max}^2)$ for the variance (8).

The mean of the posterior distribution is the maximum a posteriori (MAP) estimate, and it is possible to give an equivalent parametric representation of the latent variables as $f=K\alpha$ where $\alpha=[\alpha_1, \ldots, \alpha_n]^T$. The MAP estimate of the full GP is equivalent to minimizing the negative logarithm of the posterior (1):

$$\min_\alpha \pi(\alpha) := \frac{1}{2}\alpha^T(\sigma^2 K + K^T K)\alpha - y^T K\alpha \quad (9)$$

Similarly, using $f_I = K_I\alpha_I$ for sparse GP models, the MAP estimate of the sparse GP is equivalent to minimizing the negative logarithm of (equation 6 above):

$$\min_{\alpha_I} \tilde{\pi}(\alpha_I) := \frac{1}{2}\alpha_I^T(\sigma^2 K_I + K_{I,\cdot} K_{I,\cdot}^T)\alpha_I - y^T K_{I,\cdot}^T \alpha_I \quad (10)$$

Suppose $\alpha$ in equation 9 is composed of two parts, i.e. $\alpha=[\alpha_I; \alpha_R]$ where I denotes the set of basis vectors and R denotes the remaining instances. The optimization problem of equation 10 is the same as minimizing $\pi(\alpha)$ in equation 9 using $\alpha_I$ only, namely, with the constraint, $\alpha_R=0$. In other words, the basis vectors of the sparse GPs can be selected to minimize the negative log-posterior of the full GPs, $\pi(\alpha)$ defined as in equation 9.

In the sparse GP approach described above, the choice of I, the set of basis vectors, can make a difference. Generally the basis vectors can be placed anywhere in the input space $\mathbb{R}^m$. Since training instances usually cover the input space of interest adequately, in some methods, basis vectors are selected from just the set of training instances. For a given problem, $d_{max}$ is chosen to be as large as possible subject to constraints on computational time in training and/or testing. A basis selection method is then used to find I of size $d_{max}$.

One cheap method (in terms of processing time requirements) is to select the basis vectors at random from the training data set. But, such a choice may not work well when $d_{max}$ is much smaller than n. In one embodiment, an I is selected that makes the corresponding sparse GP approximate well the posterior distribution of the full GP. In one embodiment, the optimization formulation described above can be used. In one embodiment, it is preferable to choose, among all subsets, I of size $d_{max}$, the one that gives the best value of $\tilde{\pi}$ in (10). Such a combinatoric search is expensive. In another embodiment, a cheaper approach is to do greedy forward selection used in prior methods.

With regard to time complexities associated with forward selection, there are two costs involved. There is a basic cost associated with updating of the sparse GP solution, given a sequence of chosen basis functions, referred to as $T_{basic}$. This cost is the same for all forward selection methods, and is $O(nd_{max}^2)$. Then, depending on the basis selection method, there is the cost associated with basis selection. The accumulated value of this cost for choosing all $d_{max}$ basis functions is referred to as $T_{selection}$. Forward basis selection methods differ in the way they choose effective basis functions while keeping $T_{selection}$ small. It is noted that the total cost associated with the random basis selection method mentioned earlier is $T_{random}=T_{basic}=O(nd_{max}^2)$. This cost forms a baseline for comparison.

One example is a typical situation in forward selection having a current working set I, and the next basis vector, $x_i$, is to be selected. One method evaluates each given $x_i \notin I$ by trying its complete inclusion, i.e., set $I'=I\cup\{x_i\}$ and optimize $\pi(\alpha)$ using $\alpha_{I'}=[\alpha_I; \alpha_i]$. Thus, the selection criterion for the instance $x_i \notin I$ is the decrease in $\pi(\alpha)$ that can be obtained by allowing both $\alpha_I$ and $\alpha_i$ as variables to be non-zero. The minimal value of $\pi(\alpha)$ can be obtained by solving $\min_{\alpha_{I'}} \pi(\alpha_{I'})$ defined in equation 10. This costs O(nd) time for each candidate, $x_i$, where d is the size of the current set, I. If all $x_i \notin I$ need to be tried, it will lead to O($n^2$d) cost. Accumulated till $d_{max}$ basis functions are added, this leads to a $T_{selection}$ that has O($n^2 d_{max}^2$) complexity, which is disproportionately higher than $T_{basic}$. Other methods have resorted to a randomized scheme by considering only $\kappa$ basis elements randomly chosen from outside I during one basis selection. A value of $\kappa$=59, is normally used, although other values can be used. For this randomized method, the complexity of $T_{selection}$ is O($\kappa n d_{max}^2$). Although, from a complexity viewpoint, $T_{basic}$ and $T_{selection}$ are comparable, it should be noted that the overall cost of the method is about 60 times that of $T_{random}$.

In one relatively cheap heuristic criterion for basis selection, the "informativeness" of an input vector $x_i \notin I$ is scored by the information gain $$D[Q(f_{I'}|y) \| P(f_{I'} | y)] = \int Q(f_{I'}|y) \log \frac{Q(f_{I'}|y)}{P(f_{I'}|y)} df_{I'} \quad (11)$$

where I' denotes the new set of basis vectors after including a new element $x_i$ into the current set I, and $f_{I'}$ denotes the vector of latent variables of I'. P($f_{I'}$|y) is the true posterior distribution of $f_{I'}$, defined as in equation 6. Q($f_{I'}$|y)∝Q(y|$f_{I'}$)P($f_{I'}$) is a posterior approximation, in which the "pseudoinclusion" likelihood is defined as $$Q(y|f_{I'}) \propto N(y^{\setminus i}; (K_I^{\setminus i})^T K_I^{-1} f_I, \sigma^2 I_{n-1}) N(y_i|f(x_i), \sigma^2) \quad (12)$$

where $y^{\setminus i}$ denotes the target vector after removing $y_i$, $K_I^{\setminus i}$, denotes the d×(n−1) covariance matrix after removing, from $K_I$, the column corresponding to $x_i$ and $f(x_i)$ denotes the latent variable at $y^{\setminus i}$. In the proper inclusion as in equation 5, the latent variable $f(x_i)$ would be coupled with the targets $y^{\setminus i}$ in the likelihood, whereas the approximation (equation 12) ignores these dependencies. Due to this simplification, the score in equation 11 can be computed in O(1) time, given the current predictive model represented by I. Thus, the scores of all instances outside I can be efficiently evaluated in O(n) time, which makes this algorithm almost as fast as using random selection. In one embodiment, the correlation in the remaining instances $\{x_i: x_i \notin I\}$ is not used, as the criterion (equation 11) is evaluated upon the current model.

The two methods presented above are extremes in efficiency. In one method, $T_{selection}$ is disproportionately larger than $T_{basic}$ while, in the other method, $T_{selection}$ is very much smaller than $T_{basic}$. Now described is a moderate method that is effective and whose complexity is in between the two above described methods. This method uses a kernel matching pursuit approach.

Kernel matching pursuit is a sparse method for ordinary least squares that includes two general greedy sparse approximation schemes, called "pre-backfitting" and "post-backfitting." The presently described method illustrates that both methods can be generalized to select the basis vectors for sparse GPs. This method is an efficient selection criterion that is based on post-backfitting methodology.

Figure 4:
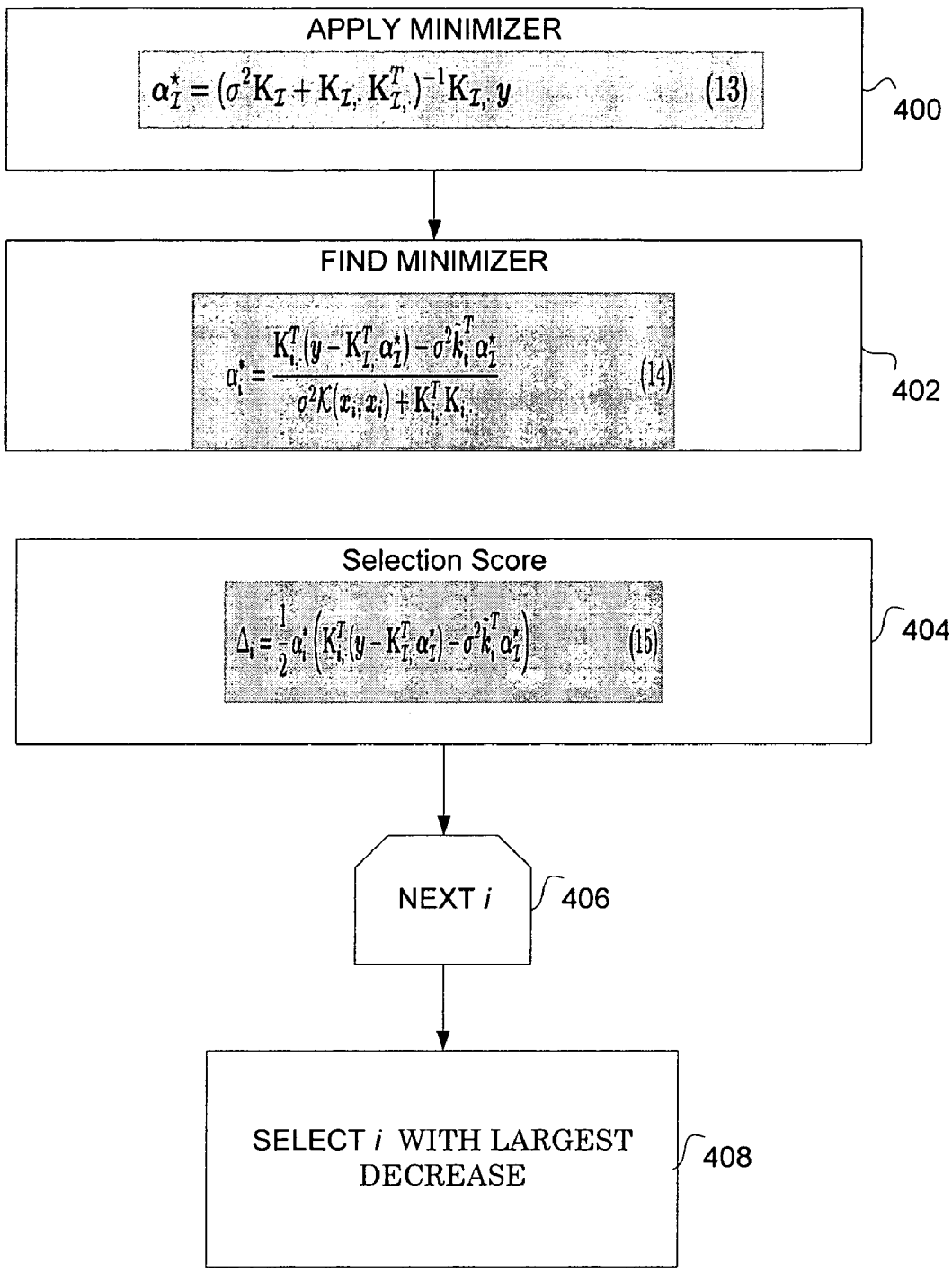
FIG. 4 is a flow diagram illustrating further steps performed by one embodiment of GP basis selection.

With reference to FIG. 4, a flow diagram shows steps performed by the system 100 according to this method. Given the current I, the minimal value of $\pi(\alpha)$ when it is optimized using only $\alpha_I$ as variables is equivalent to $\min_{\alpha_I} \pi(\alpha_I)$ as in equation 10, step 400. The minimizer, denoted as $\alpha_I^*$, is given by $$\alpha_I^* = (\sigma^2 K_I + K_I K_I^T)^{-1} K_I y \quad (13)$$

The scoring criterion for an instance $x_i \notin I$ is based on optimizing $\pi(\alpha)$ by fixing $\alpha_I = \alpha_I^*$ and changing $\alpha_i$, only. On step 402, the one-dimensional minimizer can be found as $$\alpha_i^* = \frac{K_{i,\cdot}^T \cdot (y - K_{I,\cdot}^T \alpha_I^*) - \sigma^2 \tilde{k}_i^T \alpha_I^*}{\sigma^2 K(x_i, x_i) + K_{i,\cdot}^T \cdot K_{i,\cdot}} \quad (14)$$

where $K_{i,\cdot}$ is the n×1 matrix of covariance functions between $x_i$, and all the training data, and $\tilde{k}_i$ is a d dimensional vector having K($x_j$, $x_i$), $x_j \in I$. In Step 404, the selection score of the instance $x_i$, is the decrease in $\pi(\alpha)$ achieved by the one dimensional optimization of $\alpha_i$, which can be written in closed form as $$\Delta_i = \frac{1}{2} \alpha_i^* \left( K_{i,\cdot}^T \cdot (y - K_{I,\cdot}^T \alpha_I^*) - \sigma^2 \tilde{k}_i^T \alpha_I^* \right) \quad (15)$$

Note that a full kernel column $K_{i,\cdot}$ is used and so it costs O(n) time to compute (15). In contrast, for scoring one instance. Previous methods require, for example, O(nd) time and or O(1) time.

In one embodiment, processing is performed on all $x_i \notin I$, step 406, and the instance which gives the largest decrease is selected, step 408. This uses O($n^2$) effort. In summing the cost till $d_{max}$ basis vectors are selected, there is an overall complexity of O($n^2 d_{max}$) which is much higher than $T_{basic}$.

In one embodiment, to restrict the overall complexity of $T_{selection}$ to O($n^2 d_{max}$), the method randomly selects basis vectors which provides a relatively good selection rather than the absolute best selection. Since it costs only O(n) time to evaluate the selection criterion in equation 15 for one instance, the method can choose the next basis vector from a set of d or lt instances randomly selected from outside of I. Such a selection method keeps the overall complexity of $T_{selection}$ to O($n d_{max}^2$). From a practical point of view the scheme can be expensive because the selection criterion (equation 15) preferably computes a full kernel row $K_I$, for each instance to be evaluated.

Figure 5:
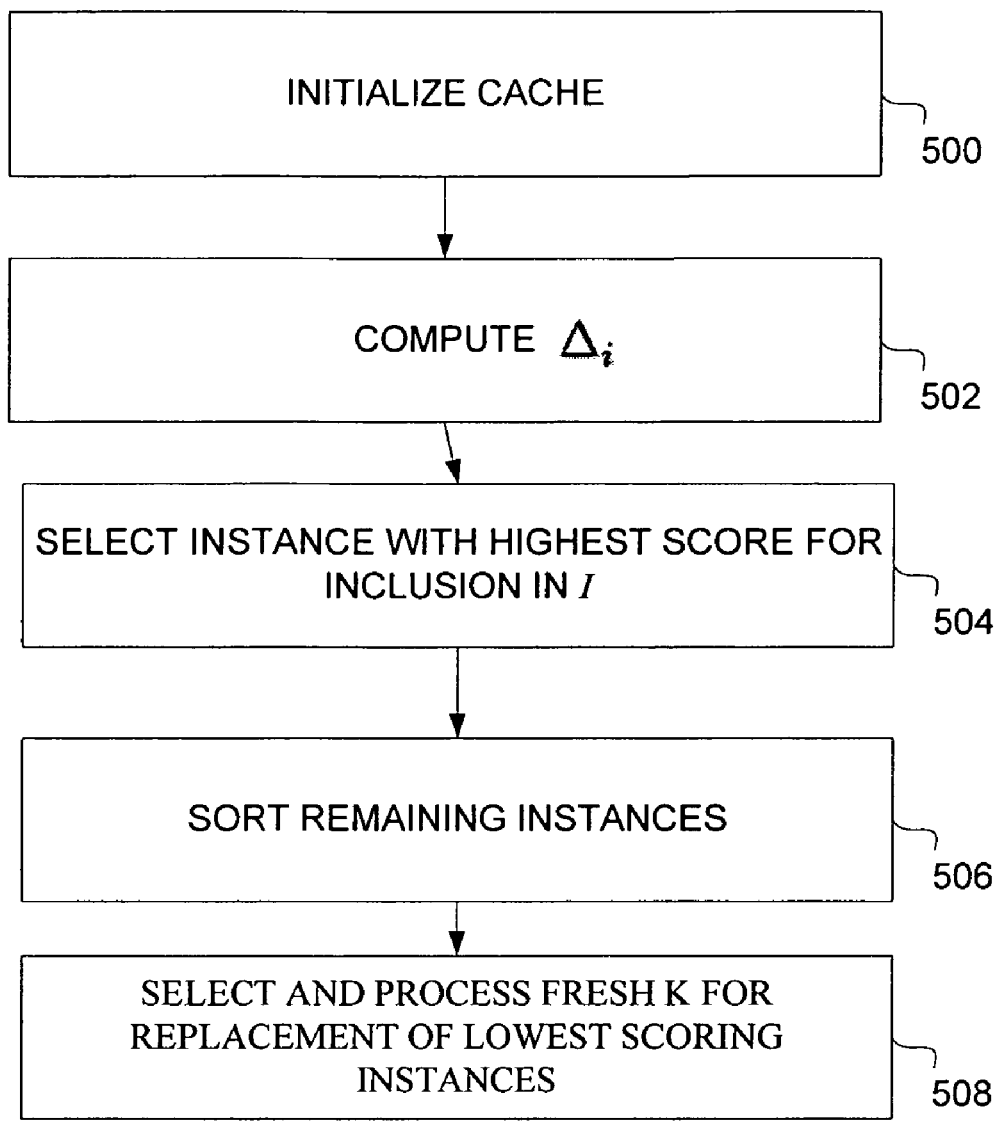
FIG. 5 is a flow diagram illustrating steps performed in a caching algorithm according to another embodiment.

As kernel evaluations could be very expensive, in one embodiment, a modified method is used to keep the number of such evaluations small. FIG. 5 is a flow diagram illustrating steps performed by the system 100 according to this embodiment. In this embodiment, a matrix cache is maintained, C, of size c×n, that contains c rows of the full kernel matrix K. At the beginning of the algorithm (when I is empty) C is initialized by randomly choosing c training instances, computing the full kernel row, $K_I$, for the chosen i's and putting them in the rows of C, step 500.

Each step corresponding to a new basis vector selection proceeds as follows. First $\Delta_i$ is computed for the c instances corresponding to the rows of C, step 502, and the instance with the highest score is selected for inclusion in I, step 504. Let $x_j$ denote the chosen basis vector. Then the remaining instances are sorted (that define C) according to their $\Delta_i$ values. Finally, the system selects r, fresh instances (from outside of I and the vectors that define C) to replace $x_j$ and the $\kappa$−1 cached instances with the lowest score. Thus, in each basis selection step, the system computes the criterion scores for c instances, but evaluates full kernel rows only for $\kappa$ fresh instances, step 508.

One advantage of the above scheme is that, those basis elements which have very good scores, but are overtaken by another better element in a particular step, continue to remain in C and, according to probability, get selected in future basis selection steps. The method uses $\kappa=59$. The value of c can be set to be any integer between $\kappa$ and $d_{max}$. For any c in this range, the complexity of $T_{selection}$ remains at most $O(nd_{max}^2)$.

The above cache method is unique to the point that it cannot be used in previously known methods without unduly increasing complexity. In one embodiment, an extra cache is used for storing kernel rows of instances which get discarded in one step, but which are to be considered again in a future step.

With respect to model adaptation, once $d_{max}$ basis vectors are selected from the training instances according to a criterion, the marginal likelihood of the sparse GP model for model selection is computed. The sparse GP model is conditional on the parameters in the kernel function and the Gaussian noise level $\sigma^2$, which can be collected together in $\theta$, the hyperparameter vector. The likelihood approximation with projected latent variables (equation 5), and equation 4, leads to the following marginal likelihood $$P(y|\theta) = \int P(y|f_I)P(f_I)df_I = N(y|0, \sigma^2 I + K_{I,\cdot}^T K_I^{-1} K_{I,\cdot})$$

which is known as the evidence, a yardstick for model selection. The optimal values of $\theta$ can be inferred by maximizing the evidence. Equivalently, $\phi(\theta)=-\log P(y|\theta)$ can be minimized. This can be performed by using gradient-based optimization techniques.

Figure 6:
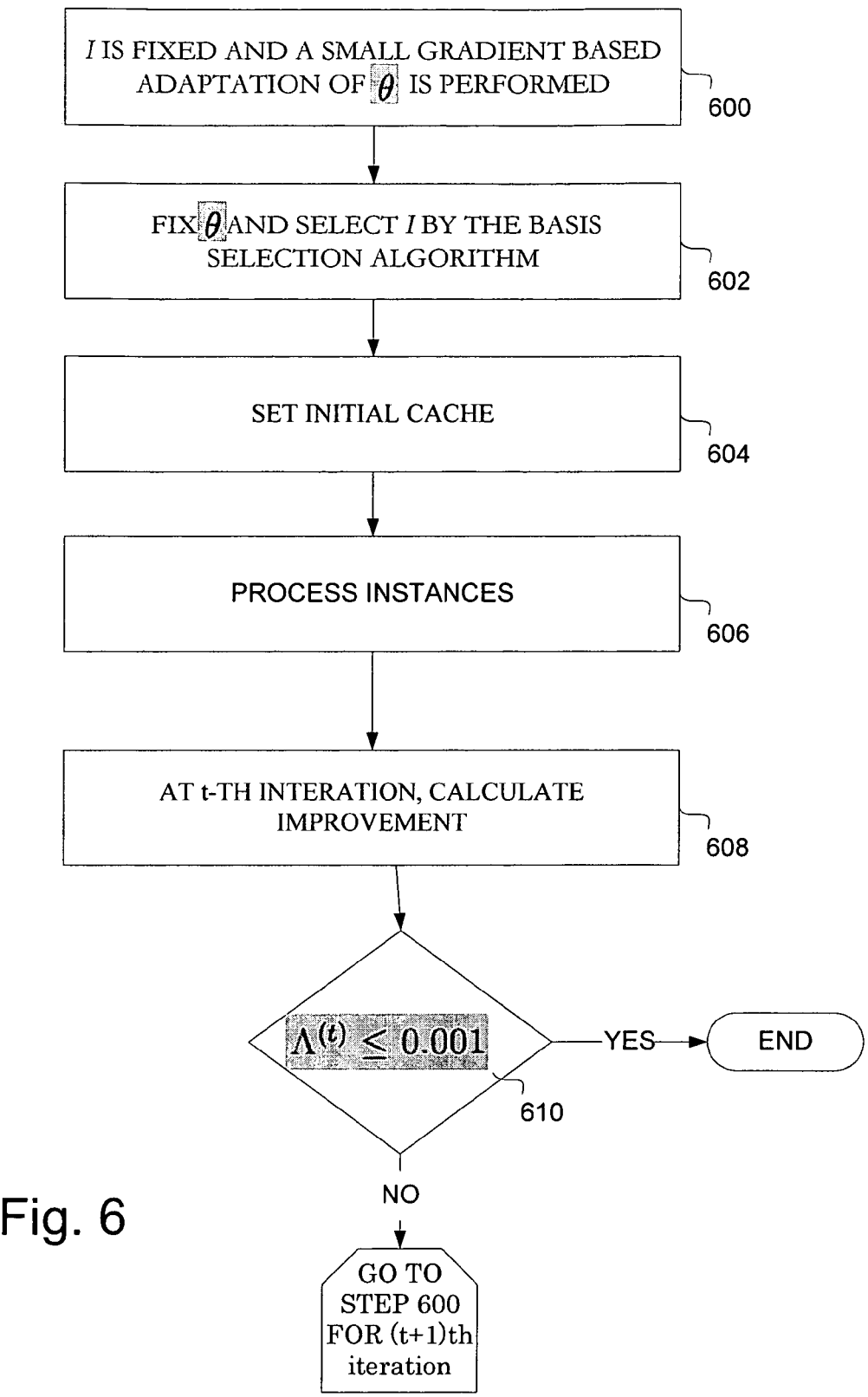
FIG. 6 is a flow diagram illustrating the steps performed in a model adaptation algorithm according to another embodiment.

One of the problems in using gradient based methods is the dependence of I on $\theta$ that makes $\phi$ a non-differentiable function. In one embodiment, with reference to FIG. 6, this issue is resolved by repeating the steps shown therein. In step 600, I is fixed and a small gradient based adaptation of $\theta$ is performed. At step 602, $\theta$ fixed and I is selected by the basis selection algorithm. It is preferable to avoid a detailed minimization in this step since that may lead to a $\theta$ where basis selection may yield a set very different from I and hence give a very different true value of the evidence at that $\theta$. In one embodiment, for example, at most, only two gradient searches are performed. For the cache-based post-backfitting method of basis selection, after step 604, the initial kernel cache, C, is set using the rows of $K_I$ at the previous $\theta$, step 604.

Because of the alternation with steps 600 and 602, in some instances, the gradients and I will not stabilize cleanly. Hence, smooth convergence cannot be expected in the model adaptation process. In one embodiment, to resolve this issue, a method is used for relative improvement on the evidence value in two iteration periods. The relative improvement at iteration t is defined as $$\Lambda^{(t)} = \frac{\phi^{(\tau_1, t-\tau_2)} - \phi^{(\tau_1, t)}}{|\phi^{(\tau_1, t-\tau_2)}|}$$

where $\tau_1$ and $\tau_2$ are lag parameters satisfying $0<\tau_1 \leq \tau_2$, $\phi^{(t)}$ is the minimal value of $\phi$ after the t-th major iteration, and $\phi^{(\tau,t)}=\min\{\phi^{(t-\tau+1)}, \ldots, \phi^{(t)}\}$, step 608. In one embodiment, it is preferable to use $\tau_1=\tau_2=10$, and to stop the adaptation procedure when $\Lambda^{(t)} \leq 0.001$, step 610. In one embodiment, a minimum of $\tau_1+\tau_2$ iterations are first performed before the convergence criterion is used.

In one embodiment, in forward selection of basis functions, the following quantities are incrementally updated: the Cholesky factorization $LL^T$ of $A=\sigma^2 K_I + K_I$, $K_I^T$, $K_I$, $\beta=\tilde{L}^{-1}K_I^T \cdot y$, $\alpha_I^*=\tilde{L}^{-T}\beta$ and $\mu=K_I^T \cdot \alpha_I^*$.

The negative logarithm of evidence can be computed as $$\phi = \log|\tilde{L}| - \log|L| + \frac{n-d_{max}}{2}\log\sigma^2 + \frac{1}{2\sigma^2}(y^T y - \beta^T \beta)$$

The derivative of $\phi$ with respect to $\log \sigma^2$ is $$\frac{\partial \phi}{\partial \log\sigma^2} = \frac{1}{2}\left(\sigma^2 tr(L^T A^{-1} L) + (n-d_{max}) + \alpha_I^{*T} K_I \alpha_I^* - \frac{1}{\sigma^2}(y^T y - \beta^T \beta)\right)$$

In the above, $tr(L^T A^{-1} L)$ can be computed by first computing $\tilde{L}^{-1}L$ and then computing the sum of squares of all elements of that matrix. The derivative with respect to a general hyperparameter, U in the kernel function is:

$$\frac{\partial \phi}{\partial v} = -\frac{1}{2}tr(K_I^{-1} - \sigma^2 A^{-1})\frac{\partial K_I}{\partial v} +$$
$$\frac{1}{2}\alpha_I^{*T}\frac{\partial K_I}{\partial v}\alpha_I^* + tr B^T \frac{\partial K_{I,\cdot}}{\partial v} - \frac{1}{\sigma^2}\alpha_I^{*T}\frac{\partial K_{I,\cdot}}{\partial v}(y-\mu)$$

where $B=A^{-1}K_I$. The i-th column, $p_i$ of B can be computed by solving two lower triangular systems: $\tilde{L}z=q_i$, where $q_i$, is the i-th column of $K_I$, and then $\tilde{L}^T p_i = z$. Computation of B is one of the most expensive computations of the algorithm; it costs $O(nd_{max}^2)$. Note that B and the cache matrix C can occupy the same storage space. Also, note that $$\frac{\partial K_I}{\partial v}$$

can be obtained from $$\frac{\partial K_{I,\cdot}}{\partial v},$$

and $$\frac{\partial K_{I,\cdot}}{\partial v},$$

does not require storage space, as the kernel values in $K_I$, can be used to compute the elements of $$\frac{\partial K_{I,\cdot}}{\partial v}$$

directly.

Thus, a more efficient system and method for regression and other supervised learning tasks has been described. While the system and method is generally described herein in the context of text categorization, specifically with respect to training vectors for categorizing indexed web pages, those skilled in the art would recognize that the system and method can be applied to any problem or system requiring selection of training vectors or elements, such as in weather pattern prediction, commercial market analysis, and the like.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A computerized method for supervised learning by performing a Gaussian process to select and yield a set of search items to a user, comprising:
    receiving a set of training elements;
    selecting a basis element from the set of training elements;
    adding the basis element to a basis element set;
    conducting an optimization test on the basis element set with the selected basis element to produce a selection score;
    determining whether the selection score indicates an improvement in optimization for the basis element set;
    discarding the basis element if the selection score does not indicate an improvement; and
    retaining the basis element in the basis element set if the selection score indicates an improvement; and
    providing the basis element set to the Gaussian process for supervised learning to select and yield a set of search items to a user.

2. The method of claim 1, comprising repeating the method for a plurality of additional basis elements.

3. The method of claim 1, wherein selecting the basis element comprises selecting at random.

4. The method of claim 1, wherein selecting the basis element comprises selecting manually.

5. The method of claim 1, comprising caching the basis element set and adding, in succession, a plurality of basis elements.

6. The method of claim 5, wherein the step of scoring is performed on the training set every $t^{th}$ addition of a basis element to the basis training set, wherein t comprises a positive integer.

7. The method of claim 1, wherein the training set comprises elements representing web pages located in a search by a search engine.

8. The method of claim 1, wherein the scoring comprises using a sparse Gaussian process.

9. The method of claim 8, comprising applying a minimizer algorithm.

10. The method of claim 9, comprising applying the following formula in a mimimizer algorithm:

$$\alpha_I^* = (\sigma^2 K_I + K_{I,.} K_{I,.}^T)^{-1} K_{I,.} y$$

where $\alpha_I^*$ is the minimizer, $K_I$ is the d×d covariance matrix of the basis vectors, $\sigma^2$ is the noise variance, y is the target output vector.

11. The method of claim 10, wherein comprising applying the following formula to find the minimizer:

$$\alpha_i^* = \frac{K_{i,.}^T (y - K_{I,.}^T \alpha_I^*) - \sigma^2 \tilde{k}_i^T \alpha_I^*}{\sigma^2 \mathcal{K}(x_i, x_i) + K_{i,.}^T K_{i,.}}$$

where $K_{i,.}$ is the n×1 matrix of covariance functions between $x_i$, and all the training data, and $\tilde{k}_i$ is a d dimensional vector having $K(x_j, x_i)$, $x_j \in I$.

12. The method of claim 11, comprising applying the following formula to find the selection score, $\Delta_i$:

$$\Delta_i = \frac{1}{2} \alpha_i^* (K_i^T (y - K_{I,.}^T \alpha_I^*) - \sigma^2 \tilde{k}_i^T \alpha_I^*).$$

13. The method of claim 1, wherein determining the selection score comprises using post-backfitting.

14. A system for supervised learning by performing a Gaussian process to select and yield a set of search items to a user, comprising:
    a training element set;
    a processor for selecting a basis element from the training element set;
    the processor for adding the basis element to a basis element set; and
    the processor for conducting an optimization test on the basis element set for optimization with the basis element to produce a selection score, for determining whether the selection score indicates an improvement in optimization for basis element set, for discarding the basis element if the selection score does not indicate an improvement, for retaining the select element in the basis element set if the selection score indicated an improvement, and for providing the basis element set to the Gaussian process for supervised learning to select and yield a set of search items to a user.

15. The system of claim 14, wherein the processor selects the basis element at random.

16. The system of claim 14, wherein the processor is for repeating the selection of a basis element a plurality of times.

17. The system of claim 14, wherein the processor is further for caching the basis element set, and adding in succession, a plurality of basis elements.

18. The system of claim 17, wherein the processor scores the basis element set every $t^{th}$ addition of a basis element to the basis element set, t comprising a positive integer.

19. The system of claim 14, wherein the training element set comprises elements representing web pages located by a search engine.

20. The system of claim 14, wherein the processor uses a sparse Gaussian process for scoring.

21. The system of claim 14, wherein the processor determines the selection score using post-backfitting.

22. The system of claim 14, wherein the processor applies a minimizer algorithm.

23. The system of claim 22, wherein the processor applies the following formula in the mimimizer algorithm:

$$\alpha_I^* = (\sigma^2 K_I + K_{I,.} K_{I,.}^T)^{-1} K_{I,.} y$$

where $\alpha_I^*$ is a minimizer, $K_I$ is the d×d covariance matrix of the basis vectors, $\sigma^2$ is the noise variance, y is the target output vector.

24. The system of claim 23, wherein the processor applies the following formula to find the minimizer:

$$\alpha_i^* = \frac{K_{i,.}^I(y - K_{I,.}^T \alpha_I^*) - \sigma^2 \tilde{k}_i^T \alpha_I^*}{\sigma^2 \mathcal{K}(x_i, x_i) + K_{I,.}^T K_{i,.}}$$

where $K_{i,.}$ is the n×1 matrix of covariance functions between $x_i$, and all the training data, and $\tilde{k}_i$ is a d dimensional vector having $K(x_j, x_i)$, $x_j \in I$.

25. The system of claim 24, wherein the processor applies the following formula to find the selection score, $\Delta_i$:

$$\Delta_i = \frac{1}{2} \alpha_i^* \left( K_{i,.}^T (y - K_{I,.}^T \alpha_I^*) - \sigma^2 \tilde{k}_i^T \alpha_I^* \right)$$

26. A method of producing and displaying a set of web pages located by a search engine as the result of a search query, the method comprising:
generating an initial result set of web pages;
selecting one or more web pages to add to the initial result set;
selecting one or more of the web pages from the initial result as one or more basis elements;
adding the one or more basis elements to a basis element set;
conducting an optimization test on the basis element set with the basis elements to produce a selection score;
determining whether the selection score indicates an improvement in optimization for the initial result set;
discarding the selected element if the selection score does not indicate an improvement; and
using the basis element set to produce and display a set of web pages located by a search engine as the result of a search query to a user.

27. The method of claim 26, comprising retaining the one or more basis elements in the basis element set if the selection score indicates an improvement.

28. The method of claim 26, comprising repeating the method for a plurality of additional basis elements.

29. The method of claim 26, wherein selecting the basis element comprises selecting at random.

30. The method of claim 26, wherein selecting the basis element comprises selecting manually.

31. The method of claim 26, comprising caching the basis element set and adding, in succession, a plurality of further basis elements.

32. The method of claim 31, wherein the step of scoring is performed on the training set every $t^{th}$ addition of one or more basis elements to the training set, wherein t comprises a positive integer.

33. The method of claim 26, wherein the scoring comprises using a sparse Gaussian process.

34. The method of claim 26, wherein determining the selection score comprises using post-backfitting.

* * * * *